United States Patent [19]

Ohkuma et al.

[11] Patent Number: 4,505,484
[45] Date of Patent: Mar. 19, 1985

[54] SEALING DEVICE FOR A ROLLING BEARING

[75] Inventors: Takeo Ohkuma; Akihiko Tanaka, both of Fujisawa, Japan

[73] Assignee: Nippon Seiko Kabushiki Kaisha, Tokyo, Japan

[21] Appl. No.: 129,678

[22] Filed: Mar. 12, 1980

[51] Int. Cl.$^3$ .......................... F16C 33/76; F16C 33/80
[52] U.S. Cl. ...................................... 277/94; 384/482; 384/486
[58] Field of Search ....................... 277/94, 83, 84, 93; 308/187.1, 187.2

[56] References Cited

U.S. PATENT DOCUMENTS 3,642,335  2/1972  Takahashi ............................ 277/94
4,226,428  10/1980 Paptzun ................................ 277/94

FOREIGN PATENT DOCUMENTS 1169214  4/1964  Fed. Rep. of Germany ........ 277/94

Primary Examiner—Robert I. Smith
Attorney, Agent, or Firm—Wyatt, Gerber, Shoup, Scobey and Badie

[57] ABSTRACT

In a sealing device for a rolling bearing wherein the clearance between an outer race and an inner race is sealed by a sealing plate fixed to the outer race side, the sealing plate has on its inner periphery an axially extending inner lip, a radially extending outer lip and an intermediate lip extending between said two lips and having the tip end thereof divided into two directions. The inner race has on its outer peripheral surface adjacent to the end thereof a concave seal groove having an inner shoulder and an outer shoulder having a diameter smaller than that of the inner shoulder. The inner lip of the sealing plate cooperates with the inner shoulder of the seal groove to form an inner sealing portion between the inner lip and the inner shoulder. The outer lip of the sealing plate cooperates with the outer shoulder of the seal groove to form an outer sealing portion between the outer lip and the outer shoulder. At least one of the bifurcated lips of the intermediate lip contacts the side wall of the seal groove to form an intermediate sealing portion.

9 Claims, 7 Drawing Figures

SEALING DEVICE FOR A ROLLING BEARING

BACKGROUND OF THE INVENTION

1. Field of the Invention

This invention relates to a sealing device where one or both sides of the device may have a sealing function for sealing a rolling bearing such as a ball bearing or a roller bearing in such a manner so as to more positively prevent the entry within the bearing of grease and foreign materials, and in which the torque loss by a sealing plate is small while the reduction of the sealing performance by axial movement of an outer race or an inner race is very small.

2. Description of the Prior Art

Various sealing devices for antifriction bearings have heretofore been proposed and some of them have been put into practice. Such devices, however are not always sufficient in respect of sealing performance and torque. More particularly, much consideration has not been given to the reduction of sealing performance by axial movement of the inner race or the outer race of the bearing during the rotation thereof. As the result of various experiments, it has been confirmed that the influence of said axial movement upon the sealing performance can be very great.

SUMMARY OF THE INVENTION

It is a primary object of the present invention to provide a sealing device for a rolling bearing wherein the sealing performance is not reduced even for axial movement of said inner or outer race.

The invention will become fully apparent from the following detailed description of some embodiments taken in conjunction with the accompanying drawings.

DESCRIPTION OF THE PREFERRED EMBODIMENTS

Figure 1:
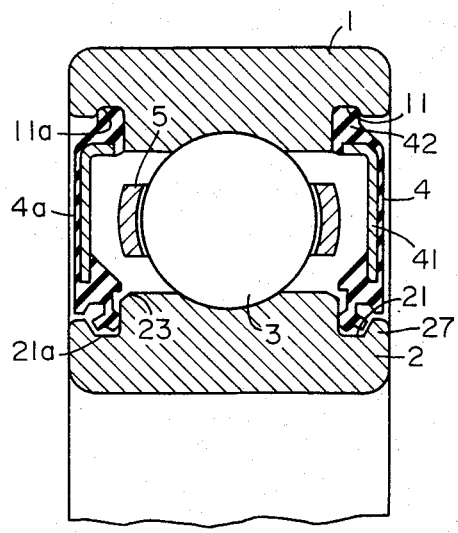
FIG. 1 is a longitudinal cross-sectional view of a double sealed bearing using the sealing device of the present invention.

In the embodiments of a ball bearing shown in FIGS. 1 to 7, reference numeral 1 designates an outer race having peripheral grooves 11, 11a in the inner peripheral surface of both the end face sides for fixing sealing members or plates 4, 4a. An inner race 2 having seal grooves 21, 21a in the outer peripheral surface of both the end face sides is also provided. Balls 3 (only one is shown) are disposed between the outer and inner races and retained by a cage 5.

The seal plates 4 and 4a have the same structure except they are minor images of one another, so only the structure of the seal member 4 will be described in detail herein below.

The sealing plate 4 is formed mainly of elastic material such as rubber, synthetic resin or the like reinforced by a metallic core material 41, and has on its outer periphery a fixing edge 42 forced into and fixed to the peripheral groove 11 of said outer race and has on its inner periphery an axially extending inner lip 43, a radially extending outer lip 44, and an intermediate lip 45, extending between said two lips 43 and 44. The intermediate lip 45 is divided at its tip end into two directions to have an inside lip (inside contact portion) 451 and an outside lip (outside contact portion) 452, so that two contact portions are formed with respect to the seal groove.

Figure 2:
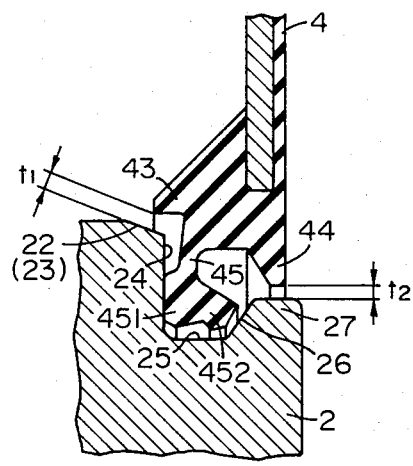
FIG. 2 is an enlarged view showing the essential parts of the sealing portion shown in FIG. 1.

First, in a first embodiment shown in FIGS. 1 to 4, the seal groove 21 of the inner race 2, as shown in FIG. 2, is formed with an axially inner side wall 24 continuous to an axially inner shoulder 23 having an obliquely outwardly sloped tapered surface 22, a bottom surface 25, an axially outer side wall 26 and an axially outer shoulder 27 having a diameter smaller than that of said inner shoulder 23.

Figure 3:
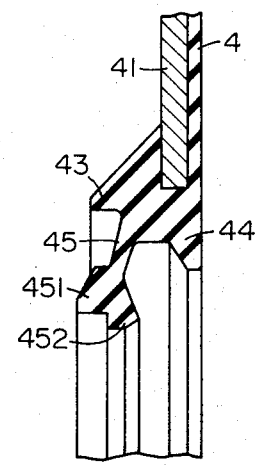
FIG. 3 is an enlarged view of the seal lip side of a sealing plate.

As shown in FIG. 3, the intermediate lip 45 of the sealing plate 4 situated between the inner lip 43 and the outer lip 44 is slightly inclined toward the inner lip 43 and the root portion thereof is more readily deformable than the other lips. The tip end of the intermediate lip 45 is formed with an axially inwardly directed inside lip 451 and an obliquely outwardly directed outside lip 452.

As shown in FIG. 2, the sealing plate 4 thus formed and fixed to the peripheral groove 11 of the outer race is such that the inner peripheral edge of the inner lip 43 is opposed to the tapered surface 22 of the inner shoulder 23 and maintains a minute clearance $t_1$ between said inner peripheral edge and said tapered surface 22 to form an inner sealing portion, that the inner peripheral surface of the outer lip 44 is opposed to the outer peripheral surface of the outer shoulder 27 and maintains a minute clearance $t_2$ between said inner peripheral surface and said outer peripheral surface to form an outer sealing portion, and that the intermediate lip 45 is resiliently deformed outwardly, and by the reaction force thereof, the inside lip 451 is brought into resilient contact with the inner side wall 24 of the seal groove and the outside lip 452 maintains a slight clearance between it and the outer side wall 26 to form an intermediate sealing portion to seal the clearance between each of said seal lips and the seal groove 21.

Figure 4:
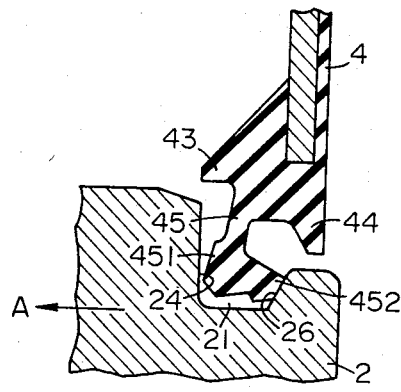
FIG. 4 is a view similar to FIG. 2 but showing the relation between the seal lip and the seal groove when the inner race has been greatly moved in the direction of arrow A in FIG. 1.

Particularly, the clearance between the outside lip 452 of the intermediate lip and the outer side wall 26, as is shown in FIG. 4, for example, is such that when the inner race 2 is greatly moved in the direction of arrow A and the inside lip 451 has been moved away from the inner side wall 24, said clearance is eliminated and the outside lip 452 contacts the outer side wall 26.

Figure 5:
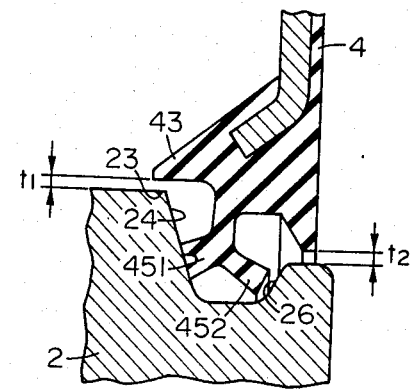
FIG. 5 is a view similar to FIG. 2 but showing a second embodiment.

FIG. 5 shows a second embodiment in which the inner side wall 24 of the seal groove is tapered and the special tapered surface 22 of the first embodiment is not provided on the inner shoulder of the seal groove.

Figure 6:
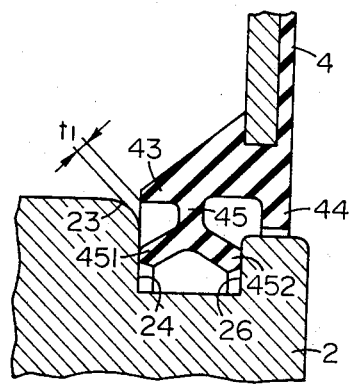
FIG. 6 is a view similar to FIG. 2 but showing a third embodiment.

FIG. 6 shows a third embodiment in which both of the two-direction lips (inside lip and outside lip) 451 and 452 of the intermediate lip 45 contact the side walls 24 and 26, respectively, of the seal groove and the inner shoulder 23 cooperating with the inner lip 43 is formed into a curved surface.

Figure 7:
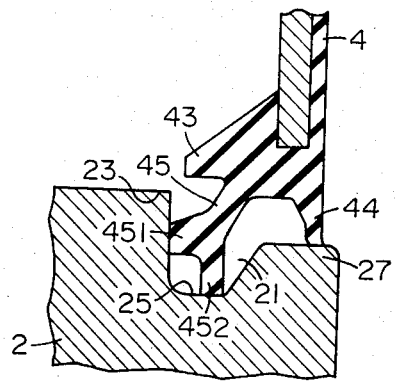
FIG. 7 is a view similar to FIG. 2 but showing a fourth embodiment.

FIG. 7 shows a fourth embodiment in which one lip 451 of the bifurcated intermediate lip 45 contacts the inner side wall of the seal groove and the other lip 452 contacts the bottom 25 of the seal groove and moreover, the outer lip 44 lightly contacts the outer peripheral surface of the outer shoulder 27.

In the sealing device of the present invention, as has been described above, the seal lip on the non-fixed side of the sealing plate 4 cooperating with the seal groove 21 of the inner race is formed into a tri-lip construction comprising the inner lip 43, the outer lip 44 and the intermediate lip 45 and particularly, the intermediate lip is formed into a bifurcated (not restricted to clear bifurcation) lip construction having two contact portions with the seal groove, and at least one lip (e.g. 451) of the bifurcated lips is assembled in contact with the side wall (e.g. 24) and, during the use of the bearing, when the inner race or the outer race is greatly moved axially to bring said lip out of contact, the other lip (e.g. 452) contacts the side wall (e.g. 26) of the seal groove or said other lip (e.g. 452) normally contacts the side wall 26 or the bottom surface 25. In other words, under any service condition of the bearing, at least one of the bifurcated lips contacts some part of the seal groove 21, thus ensuring a stable and efficient sealing effect to be obtained.

Particularly, in the first and third embodiments wherein the inner lip 43 and the outer lip 44 are kept in non-contact relation with the race and moreover the inner shoulder 23 of the seal groove cooperating with the inner lip 43 is formed into a tapered surface or a curved surface, the torque become lower, of course, and the axial and radial dimension errors of the shoulder 23 and the inner lip 43 do not directly affect the minute clearance $t_1$ but always assume a value smaller than said clearance and therefore, there are obtained the effects that the irregularity of working and mounting dimensions is small, that the degree of influence upon said movement is small and that the influence imparted to the sealing performance is small. Particularly, the sealing device of the present invention is effective as a sealing device for such bearings as the enveloped lubricant (for example, grease) type used while being mounted in a gear case as the shaft supporting device disclosed in the U.S. patent application Ser. No. 882,858 filed Mar. 2, 1978.

While the embodiments have been described with respect to a case where the sealing plate is forced into and fixed to the peripheral groove of the outer race, the means for fixing the sealing plate to the outer race is arbitrarily selected in accordance with the construction of the sealing plate itself and particularly, the sealing plate is not restricted in any way except for the construction of the lip portion of the inner peripheral side.

What we claim is:

1. A device for sealing the clearance between an outer race and an inner race of a rolling bearing; including a seal member having one side thereof adapted to be held by the outer race and the other side thereof adapted to fit within a concave groove formed in the outer peripheral surface of said inner race; said outer side of said seal member including an inner lip extending axially inward of the bearing and adapted to be spaced from the inner shoulder of said groove a distance sufficiently small to form a non-contact seal with said inner shoulder; an outer lip extending radially of said bearing and adapted to cooperate with the outer shoulder of said groove to form an outer seal with the outer shoulder; and means including an intermediate lip extending between said inner lip and said outer lip and divided to form seal surfaces extending respectively towards opposite side walls of said groove for providing two seal surfaces of said intermediate lip each adapted to engage respective ones of the side walls of said groove alternatively with the inner of said seal surfaces contacting the innermost of said groove walls when said seal member is in its innermost axial position and the outer of said seal surfaces contacting the outermost of said groove walls when said seal member is in its outermost axial position.

2. The device according to claim 1, said outer lip adapted to be spaced from the outer shoulder of said groove a sufficient distance to form a non-contact seal therewith.

3. A device according to either claim 1 or 2, said outer shoulder having a length smaller than that of said inner shoulder.

4. A device for sealing the clearance between an outer race and an inner race of a rolling bearing; including a seal member having one side thereof adapted to be held by the outer race and the other side thereof adapted to fit within a concave groove formed in the outer peripheral surface of said inner race; said other side of said seal member including an inner lip extending axially inward of the bearing and adapted to be spaced from the inner shoulder of said groove a distance sufficiently small to form a non-contact seal with said inner shoulder; an outer lip extending radially of said bearing and adapted to cooperate with the outer shoulder of said groove to form an outer seal with said outer shoulder; and means including an intermediate lip extending between said inner lip and said outer lip and divided to form seal surfaces extending respectively towards opposite side walls of said groove for providing two seal surfaces of said intermediate lip each adapted to engage respective ones of the side walls of said groove with the inner of said seal surfaces contacting the innermost of said groove walls and the outer of said seal surfaces contacting the outermost of said groove walls.

5. The device according to claim 4, said outer lip adapted to be spaced from the outer shoulder of said groove a sufficient distance to form a non-contact seal therewith.

6. A device according to either claim 4 or 5, said outer shoulder having a length smaller than that of said inner shoulder.

7. A device for sealing the clearance between an outer race and an inner race of a rolling bearing; including a seal member having one side thereof adapted to be held by the outer race and the other side thereof adapted to fit within a concave groove formed in the outer peripheral surface of said inner race; said other side of said seal member including an inner lip extending axially inward of the bearing and adapted to be spaced from the inner shoulder of said groove a distance sufficiently small to form a non-contact seal with said inner shoulder; an outer lip extending radially of said bearing and adapted to cooperate with the outer shoulder of said groove to form an outer seal with said outer shoulder; and means including an intermediate lip extending between said inner lip and said outer lip and divided to form seal surfaces extending respectively towards opposite walls of said groove for providing two seal surfaces of said intermediate lip each adapted to engage respective ones of the walls of said groove with the inner of said seal surfaces contacting the innermost of the side walls of said groove and the outer of said seal surfaces contacting the bottom wall of said groove.

8. The device according to claim 7, said outer lip adapted to contact the outer shoulder of said groove to form a contact seal therewith.

9. A device according to either claim 7 or 8, said outer shoulder having a length smaller than that of said inner shoulder.

* * * * *